United States Patent [19]
Peres

[11] 3,739,471
[45] June 19, 1973

[54] APPARATUS FOR AUTOMATICALLY OPENING AND EMPTYING CONTAINERS INTO A BLENDING TANK

[75] Inventor: Anthony R. Peres, Bristol, N.Y.

[73] Assignee: Peres Electronic Machinery, Inc., Rochester, N.Y.

[22] Filed: June 17, 1971

[21] Appl. No.: 153,942

[52] U.S. Cl............ 30/4 R, 30/5.5, 30/8, 134/62, 214/305
[51] Int. Cl............ B67b 7/38, B67b 7/44
[58] Field of Search............ 30/4 A, 4 R, 8, 16, 30/6, 21.5, 5.5; 214/305; 32/10; 134/62

[56] References Cited
UNITED STATES PATENTS

| | | | |
|---|---|---|---|
| 1,456,525 | 5/1923 | West | 30/8 |
| 1,505,833 | 8/1924 | Wells | 30/8 |
| 1,536,053 | 5/1925 | Baker | 30/16 X |
| 3,080,078 | 3/1963 | Carew | 214/305 |
| 3,487,965 | 1/1970 | Gale | 214/305 X |

FOREIGN PATENTS OR APPLICATIONS
809,537  2/1959  Great Britain .................. 30/5.5

Primary Examiner—Othell M. Simpson
Assistant Examiner—Gary L. Smith
Attorney—George W. Shaw and Eugene S. Stephens

[57] ABSTRACT

A method and apparatus for automatically opening containers and emptying product contained therein into a blending tank where it may be blended with other ingredients. An intermittently operated transport mechanism transports the containers in succession through a series of work stations comprising a cleaning station, an opening station, a top removing and wiping station, an emptying, heating and washing station, a rinsing station, and discharge station. The product emptied from the containers, the adhering product wiped off the container tops, the heating and rinsing water, and any added ingredients are blended together in the blending tank.

6 Claims, 8 Drawing Figures

APPARATUS FOR AUTOMATICALLY OPENING AND EMPTYING CONTAINERS INTO A BLENDING TANK

BACKGROUND OF THE INVENTION

1. Field of the Invention:

This invention relates generally to blending mechanisms, and more specifically to a method and apparatus for automatically opening containers and emptying product from the containers into a blending tank.

2. Description of the Prior Art

It is known in the prior art to provide both manually-operated and motor-driven container openers of varied design for severing off the top of a container. The container may then be emptied by manually or mechanically tipping the container and emptying the contents thereof into any suitable receptacle or blending tank. Where only one or two containers have to be opened, and time is not a factor, such container openers are completely satisfactory. A problem arises, however, in operations where a large number of containers have to be opened as rapidly as possible, and the contents thereof emptied into a common mixing or blending tank. An example of such an operation is a mass production manufacturing facility in which the product is supplied in small containers, the containers opened, and the product contained therein emptied into a tank and blended with water and/or other ingredients before being pumped to a further processing station. In this type of operation, the opening and emptying of the containers is a slow, time-consuming task. Not only must each of the containers be opened by manually operated container openers, but in addition each container must be emptied into the blending vat by manual or manually operated means, and the containers manually rinsed out.

SUMMARY OF THE INVENTION

This invention includes within its scope a method and apparatus for intermittently transporting containers in succession through a series of work stations along a production line for automatically (1) cleaning the containers, (2) severing the top of each container, (3) removing each top and wiping off the product adhering thereto, (4) substantially simultaneously emptying, heating and washing each container, (5) rinsing out the remaining product within each container, and (6) discharging the empty container into any suitable receptacle. More specifically, a chain conveyor transports containers containing product in succession through a tunnel containing water jets through which heated water is directed for thoroughly cleaning the outside of each container. The cleaned containers are transported to the container opening station where each container is stopped, the sides thereof grasped by a gripping means, and the circular container top completely severed off. The container and severed top are released and transported to a container top removing and wiping station where a suction means or magnet grips the severed top, and moves the top across a wiper for wiping the product from its undersurface. The container is then transported to an emptying, heating and washing station where a guide means rotates each container through approximately 180° for emptying the contents thereof into a blending tank, and the container is simultaneously sprayed with hot water to facilitate removal of the product from the container. The inverted container is then transported to the rinsing station where the inside of the container is rinsed clean of product. The empty container is transported and discharged into any suitable discharge receptacle.

It is therefore an object of the present invention to provide a method and apparatus for automatically successively opening containers and emptying product contained therein into a blending tank in rapid succession.

Another object of the invention is to provide automated apparatus for successively opening containers and emptying the product contained therein into a blending tank, said apparatus further being of simple design and construction, thoroughly reliable and efficient in operation, and economical to manufacture.

Another object of the invention is to provide an improved apparatus for rapidly and efficiently severing the top of a container.

The invention and its objects and advantages will become more apparent from the detailed description of the preferred embodiment presented below.

BRIEF DESCRIPTION OF THE DRAWING

In the detailed description of the preferred embodiment of the invention presented below, reference is made to the accompanying drawings, in which.

Figure 1A:
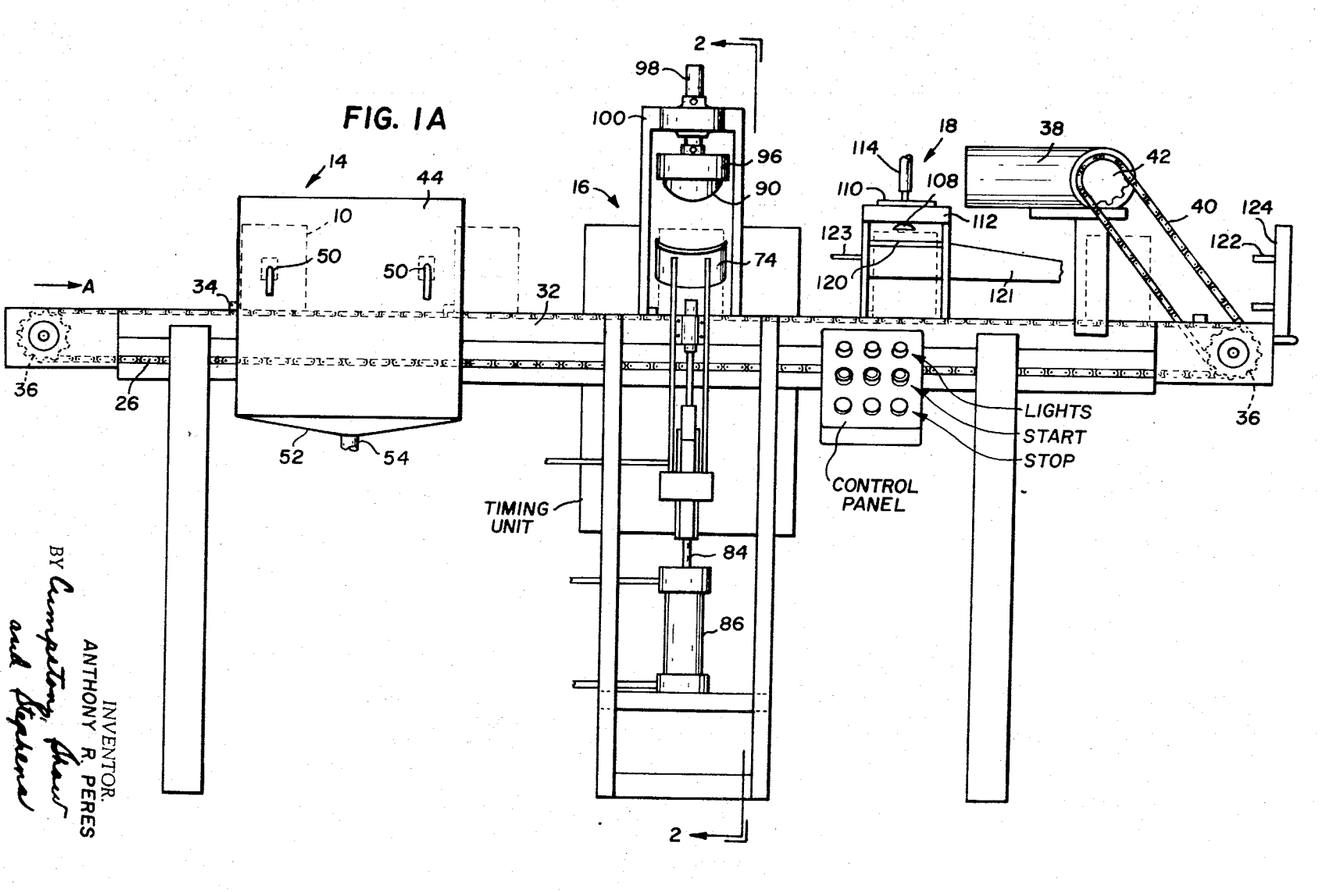
FIG. 1A is a side elevational view of the left or leading end portion of the apparatus of this invention containing in sequence from left to right container washing, container opening and container top removing and wiping stations.
Figure 1B:
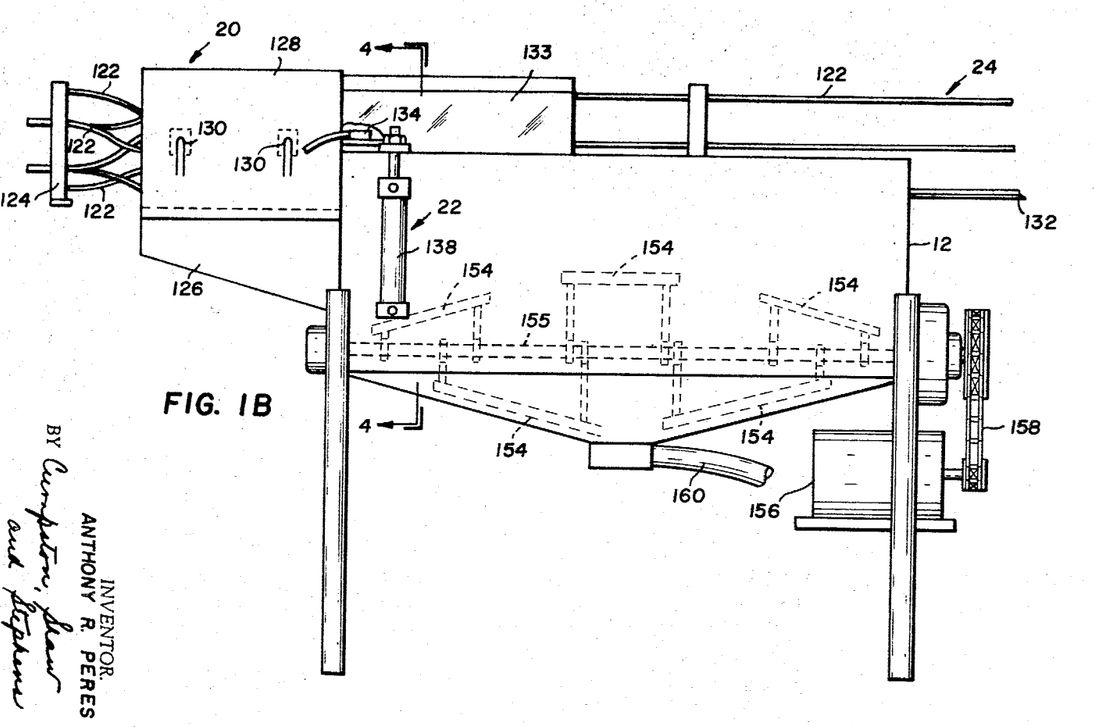
FIG. 1B is a side elevational view of the right or trailing end portion of the mechanism of FIG. 1A containing in sequence from left to right container emptying, heating and washing, container rinsing and container discharge stations.

DESCRIPTION OF THE PREFERRED EMBODIMENT:

With reference to the drawings, the container opening and emptying apparatus of this invention for emptying product from containers 10 into a blending tank 12 is illustrated as comprising a plurality of work stations. In FIG. 1A, a container cleaning station 14, a container top severing station 16, and a container top removing and wiping station 18, are shown. In FIG. 1B, a container emptying, heating and washing station 20, a container rinsing station 22, and a container discharge station 24 are shown. The containers 10 are intermittently transported in single file array from a loading station (not shown) in sequence through the aforementioned work stations by any suitable transport means (see FIG. 2) such as an endless conveyor chain 26 having its upper reach 28 extending through an elongated slot 30 in a bed 32 and having spaced-apart fingers 34, only two of which are shown in FIG. 1A, for engaging a side of a container 10 and pushing it along the bed in the direction of the arrow A as seen in FIG. 1A. The conveyor chain 26 is trained over sprockets 36, one of which is intermittently driven by a drive motor 38 through an endless drive chain 40 trained over pinions 42, only one of which is shown, drivingly coupled to the motor 38 and conveyor 26. The containers 10 are transported through the stations 20, 22 and 24 following the conveyor (see FIG. 1B) by the pushing action of the containers intermittently advanced by conveyor 26.

The container cleaning station 14 (see FIG. 1A) comprises a stainless steel enclosure 44 or the like through which the containers 10 are transported by conveyor 26. The enclosure 44 is provided with a plurality of water nozzles 50 for directing sprays of preferably heated water over the containers 10 as they pass through the enclosure for thoroughly cleaning the outer surfaces of the containers. Although only two nozzles 50 are shown on one side of the enclosure, any number of water nozzles may be provided and arranged in various positions along the sides and top of enclosure 44 for directing sprays of water in all directions for optimum cleaning efficiency. The water from nozzles 50 is collected in a funnel shaped sump 52 at the bottom of the enclosure and is preferably emptied through conduit 54 into any suitable waste receptacle, (not shown).

Figure 2:
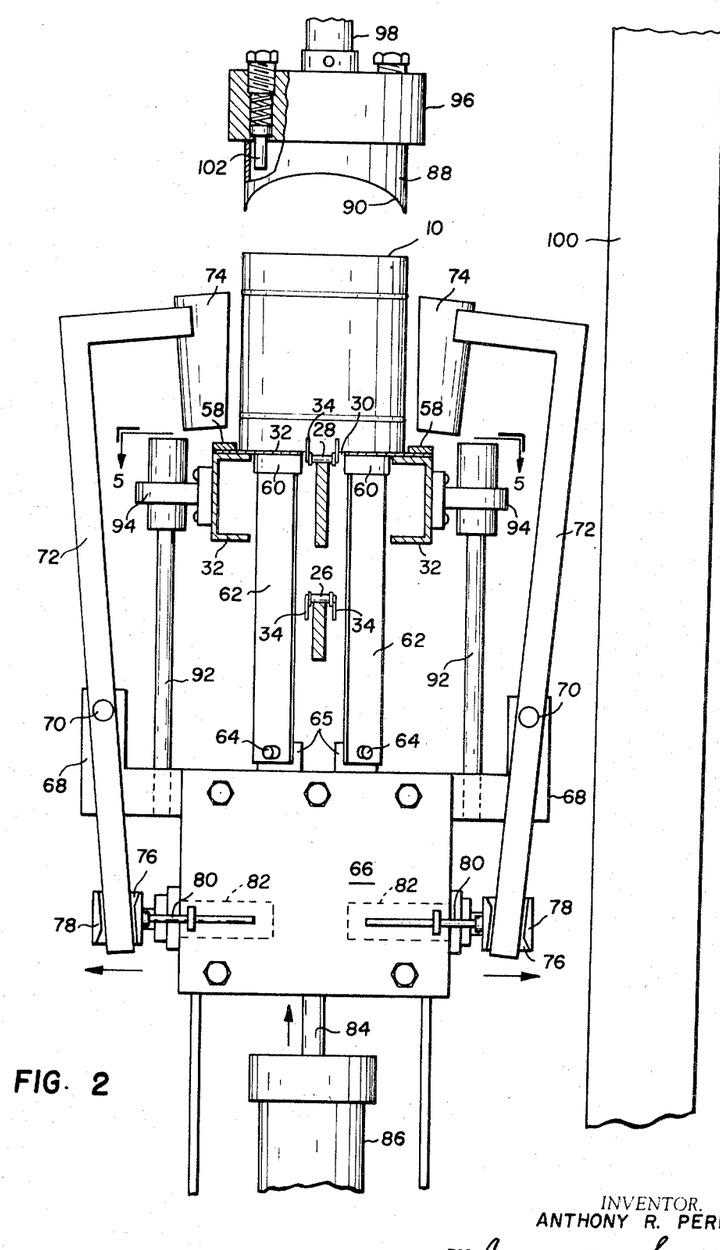
FIG. 2 is an enlarged section view taken substantially along line 2 — 2 of FIG. 1A and showing the severing mechanism in its normal non-severing position.
Figure 3:
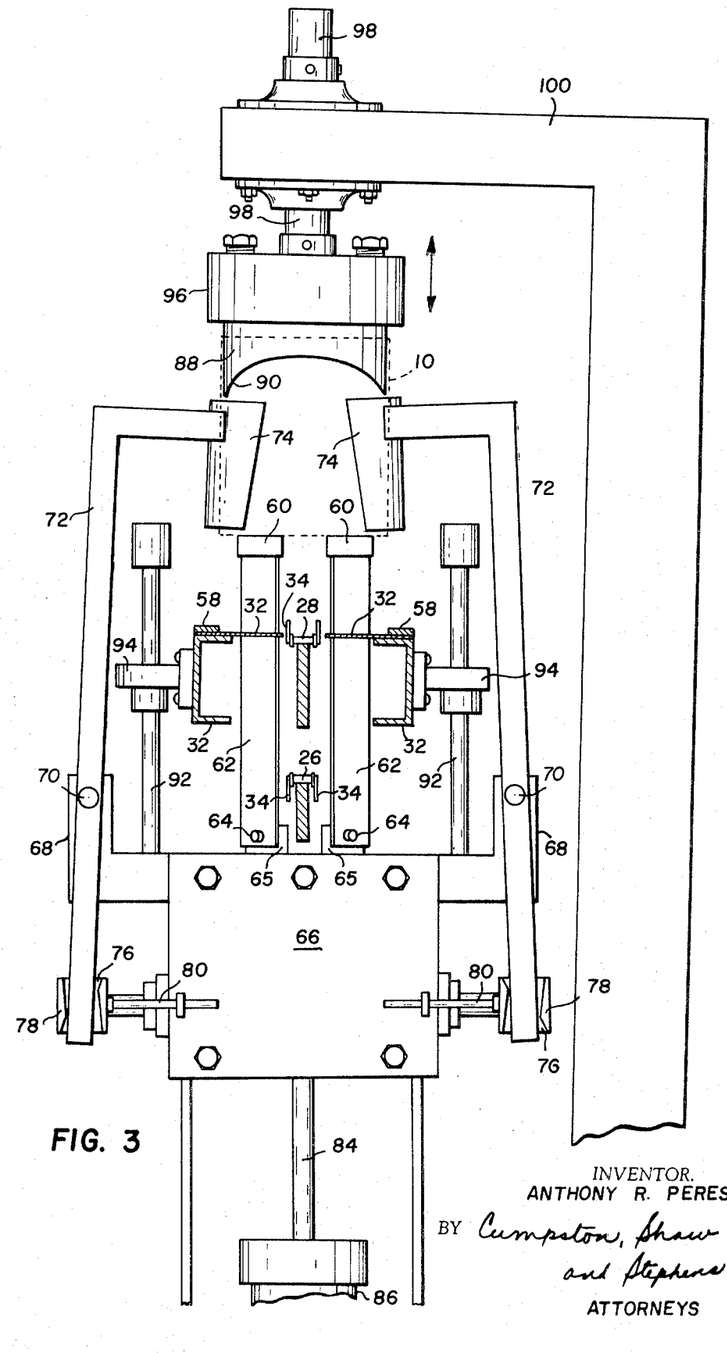
FIG. 3 is an enlarged view similar to FIG. 2 showing the severing mechanism in a container top severing position.
Figure 5:
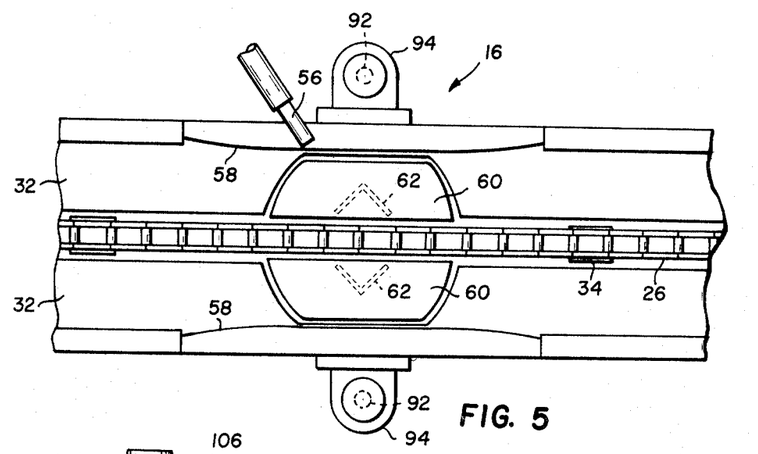
FIG. 5 is an enlarged section view taken substantially along line 5 — 5 of FIG. 2.

As best seen in FIGS. 1A, 2, 3 and 5, each of the cleaned containers 10 is intermittently transported to the container top severing station 16 where the container is sensed as it reaches the precise severing position by any suitable sensing mechanism such as a fluidic sensor 56 (see FIG. 5). Such fluidic sensors normally have an air port through which low pressure air is forced, and when a container is advanced to the precise severing position, the air port is partially blocked generating back pressure which actuates a switch discontinuing power to the chain drive motor, hence stopping further advance of the container. The sidewalls 58 of the bed 32 are suitably shaped at the severing station 16 for guiding each of the containers 10 into the station and precisely locating the container in a lateral direction. At this point, the bottom of the container is resting on a pair of elevator plates 60 as best seen in FIGS. 2 and 5 forming a part of the bed and mounted on the upper end of a pair of upstanding V-shaped bars 62, the opposite ends of which are secured by any suitable means to pins 64 on extensions 65 of a frame member 66. A pair of L-shaped arms 68 are rigidly secured by bolts or the like to the upper end of frame member 66, and the arms are provided with pins 70 each adapted to pivotally support a pair of L-shaped inverted levers 72, each having an arcuate container gripping shoe 74 secured by welding or the like to one end, and its opposite end extending into a slot 76 in a coupling 78 secured to piston rod 80 of a gripping fluid or air cylinder 82 shown dotted in FIG. 2. When the gripping cylinders 82 are actuated by any suitable electrical-pneumatic control system to be described hereinafter for moving the piston rods 80 inwardly as best seen in FIG. 2, the levers 72 are pivoted in a direction for moving friction shoes 74 to a gripping position as seen in FIG. 3 for securely gripping a container 10 precisely located at the severing station 16. The slots 76 in coupling 78 are suitably shaped to provide clearance and permit pivotal movement of the ends of levers 72. The frame member 66 is further secured by any suitable means to one end of a piston rod 84 of a lift fluid or air cylinder 86 which in its normal position as seen in FIG. 2, is in a nonsevering position with lifting plates 60 lying in the same plane as the conveyor bed 32. When air under pressure is properly supplied by the electrical-pneumatic control system to cylinder 86, piston rod 84 is raised or moved vertically upwardly causing lifting plates 60 and gripping shoes 74 to rapidly raise the gripped container 10 and force it against an annular cutting or shearing blade 88, preferably having a serpentine cutting surface or edge 90. The frame member 66, bars 62, levers 72 and shoes 74 are guided for vertical movement by rods 92 journaled in bearings 94 secured to bed 32. The cutting blade 88 has a diameter slightly less than the diameter of container 10, and the container is raised sufficiently so that the annular blade severs a circular top 95 (see FIG. 7) from the container. The annular cutting blade 88 is secured to a cylindrical base plate 96 by any suitable means, and plate 96 is in turn secured to a vertically movable shaft 98 journaled in a frame 100 (see FIG. 3) and adjustable secured thereto for varying the vertical height of blade 88 relative to container 10. When container 10 is raised spring biased pins 102 carried by plate 96 are tensioned, and when the container is lowered, tensioned pins 102 eject the severed top from cutting blade 88. Although a plurality of pins 102 are used, a spring biased ring (not shown), could be substituted therefor. To assist in the severing action, annular blade 88 may be frusto-conically shaped with the smaller diameter end serving as the cutting edge. The angle of inclination from the vertical would preferably be only a few degrees.

Figure 6:
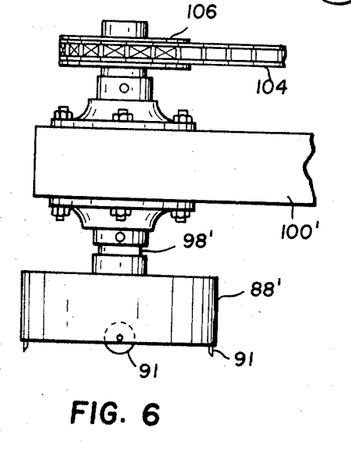
FIG. 6 is a segmental side elevational view showing a modification of the severing mechanism of this invention.

With reference to FIG. 6, a modification of the severing mechanism is illustrated in which the shaft 98' is journaled for both axial and rotatable movement. The shaft 98' and cutting blade 88' are rotatably driven during the severing action by a motor, not shown, which drives a chain 104 trained over a sprocket 106 secured to the upper end of shaft 98'. The cutting blade 88' comprises an annular member provided with a plurality of cutting wheels 91 rotatably mounted at one end thereof for engaging the upper end of the container.

Although the severing of container tops 95 is accomplished by moving the container 10 relative to a fixed or rotatable blade 88, it should be understood that the container could be fixedly gripped by the gripping shoes 74 and the blade 88 moved vertically downwardly by any suitable air cylinder, not shown, into severing engagement with the fixed container.

Figure 7:
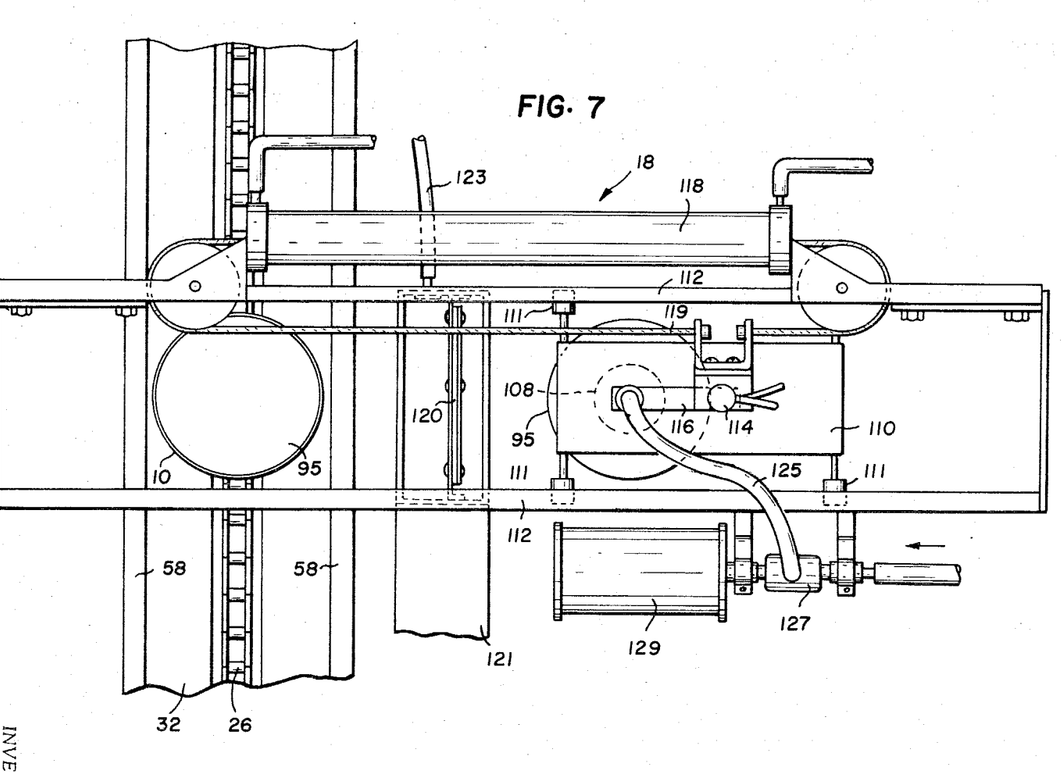
FIG. 7 is an enlarged segmental top plan view showing the container top removing and wiping mechanism of FIG. 1A.

After the severing operation has been completed, the container 10 with its severed top is advanced to the container top removing station 18 as best seen in FIGS. 1A and 7. At top removing station 18, a suction cup 108 mounted on a carriage 110 having rollers 111 slidably on guide rails 112 is vertically lowered into engagement with container top 95 and then raised for removing the top from the container. Any suitable air cylinder 114 having its cylinder rod coupled by arm 116 to suction cup 108 may be provided for moving the suction cup vertically up and down. When container top 95 is in its raised, level position, carriage 110 is moved on guide rails 112 by air cylinder 118 coupled to carriage 110 by a cable 119 causing the top to move across a fixed wiper blade 120 which wipes the product off of the undersurface of the top and into a stainless steel chute 121 from which the product is washed by water from inlet 123 into blending tank 12. The suction cup 108 is connected by a conduit 125 to a source of vacuum formed by air forced through a venturi valve 127 and exiting through an air muffler 129. If desired, any other gripping device such as an electro-magnet, not shown, may be used in place of suction cup 108. After the top is wiped clean, the suction is removed and the top 95 dropped into any suitable receptacle, not shown. The carriage 110 is returned to its normal cap removal position in which suction cup 108 is above and in register with a container 10 on conveyor 26.

The container 10 with its top 95 removed is transported to the container emptying, heating and washing station 20 (see FIG. 1B) where the container is transported through a plurality of spaced, spiral rods 122 rigidly secured to frame members 124 at each end, only one of which is shown in FIG. 1B, and arranged to form a spiral tunnel. As the containers 10 are advanced through the tunnel formed by rods 122, they automatically turn the container through an angle of substantially 180° so that the open end is down and the product in the container empties by gravity into a stainless steel inclined chute 126 which directs the product by gravity into the stainless steel blending tank 12. An enclosure 128 similar to the aforementioned enclosure 44 is mounted above the inclined chute 126, and is also provided with a plurality of nozzles 130 on the inside surface thereof for directing streams of hot water at all angles against the container 10 as it is turned to facilitate removing the product from the container and washing the product into tank 12.

Figure 4:
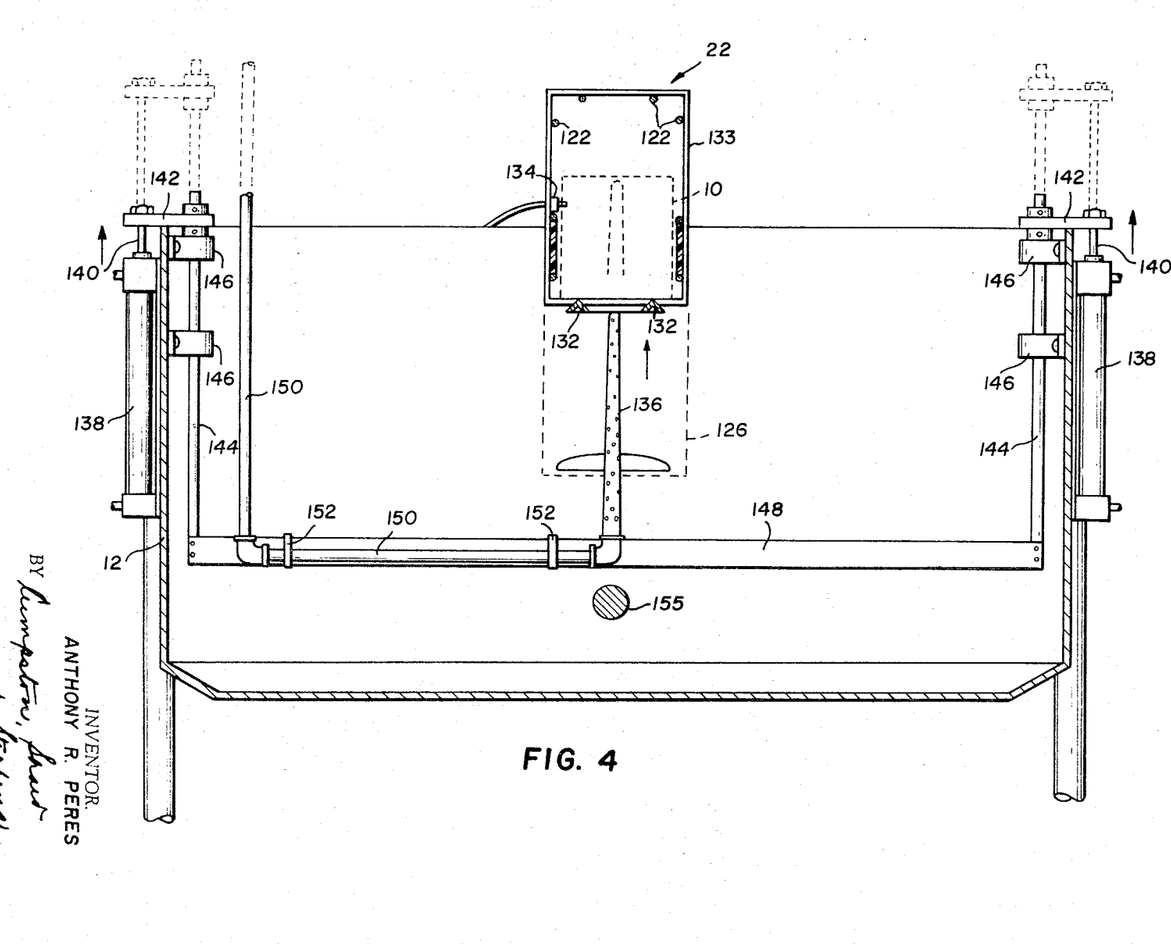
FIG. 4 is an enlarged section view taken substantially along line 4 — 4 of FIG. 1B.

The virtually empty container 10 is transported or pushed by the containers advanced by conveyor 26 onto a pair of V-shaped preferably plastic or stainless steel rails 132 (see FIG. 4) within a tunnel 133 to the rinsing station 22 within the blending tank 12 as best seen in FIGS. 1B and 4. The apparatus is designed so that each container pushed into tunnel 133 advances a container precisely in register with a vertically extending perforated rinsing nozzle 136. The container 10 is sensed by any suitable sensing mechanism such as a fluidic sensor 134 when a container is in register with nozzle 136. The fluidic sensor 134 generates air pressure for closing fluidic switches, not shown, for actuating a pair of air cylinders 138 for raising cylinder rods 140, links 142, and rods 144 journaled in bearings 146 supported by tank 12 to the broken-line position shown in FIG. 4. The rods 144 are secured to the ends of a crossbar 148 to which a hot water conduit 150 connected to nozzle 136 is secured by clamps 152. When rods 144 are raised by the action of the cylinders 138 to the aforementioned dotted position in FIG. 4, nozzle 136 is inserted within container 10 and the hot water is turned on preferably by the electrical-pneumatic control system for rinsing out the remaining product within the container. The nozzle 136 may be rotatably mounted on the end of conduit 150 if desired, and any suitable drive means, not shown, may be provided for rotating nozzle 136 for achieving a better rinsing action. After the inside of container 10 has been thoroughly rinsed, the cylinders 138 are actuated to return nozzle 136 to its normal retracted position as seen in full lines in FIG. 4. As additional containers 10 enter rinsing station 22, the rinsed containers are pushed step-by-step along rails 132 and eventually drop off the rails and into any suitable storage receptacle, not shown. The product emptied from containers 10, the rinsing water, and any additional water or ingredients that may be added are all mixed or blended together in blending tank 12 by any suitable rotatable stainless steel paddles 154 (see FIG. 1B) secured to a shaft 155 rotatably driven by a motor 156 through a chain and sprocket drive 158. When thoroughly blended to the proper degree, the blended contents of tank 12 are pumped by any stainless steel discharge pump or the like, not shown, through a conduit 160 to a further processing station, not shown.

The aforementioned electrical-pneumatic control system for controlling the operation of the mechanisms at the aforementioned stations may be of any suitable type well known in the art. The fluid cylinders are preferably air cylinders operated by compressed air directed to the cylinders by any suitable air valves, and the valves are controlled by any suitable electrical or mechanical timing unit or units mounted in a control box (see FIG. 1A) secured to frame 100 for operating the valves in timed relation. The mechanism is controlled by an electrical control panel as seen in FIG. 1A having three "start" buttons for connecting power to the conveyor, blender and discharge pump, and located in the central horizontal row. The upper horizontal row comprises three lamps, each of which lights up when its corresponding "start" button is depressed to indicate that the conveyor, blender or pump is operating. The lower horizontal row comprises three "stop" buttons for stopping the operation of its corresponding conveyor, blender or pump.

The invention has been described in detail with particular reference to a preferred embodiment thereof, but it will be understood that variations and modifications can be effected within the spirit and scope of the invention as described hereinabove.

I claim:

1. In a mechanism for opening containers having an end of a predetermined shape and size, the combination comprising:

gripping means movable to a gripping position for gripping a container to be opened;

cutting means having an endless knife edge of a shape conforming to said predetermined shape and of a slightly smaller size;

power means coupled to one of said gripping means and cutting means for forcing said one of said gripping means and cutting means a sufficient distance to cause said knife edge to pierce and shear off the end of the container;

said gripping means comprising spaced container-engaging shoes and a first fluid cylinder for moving said shoes into engagement with opposite sides of said container for releasably gripping said container; and said power means comprising a second fluid cylinder for moving said gripping means.

2. The invention according to claim 1 wherein said cutting means comprises a cylindrical cutting tool having an annular knife edge at one end thereof.

3. The invention according to claim 1 wherein each container has a circular end, and said cutting means comprises a cylindrical cutting tool having an annular knife edge at one end thereof, said knife edge further being serpentine shaped.

4. The invention according to claim 1 wherein said cutting means is rotatable.

5. The invention according to claim 1 wherein said cutting means is rotatable, and further including drive means for rotatably driving said cutting means in timed relation to operation of said power means.

6. In a mechanism for opening a container, the combination comprising:

gripping means comprising a support block, a pair of movable, spaced container engaging shoes supported by said block, and first fluid cylinders for moving said shoes into engagement with opposite sides of a container for releasably gripping the container;

cutting means comprising a cylindrical cutting tool having an annular serpentine shaped knife edge at one end, said knife edge having a diameter slightly less than the diameter of one end of a container to be opened and being positioned in alignment with the end of the container; and power means comprising a second fluid cylinder coupled to said support block and operated in timed relation to the operation of said first fluid cylinders for moving the gripping means and the container gripped thereby toward said cutting means a sufficient distance to cause said knife edge to pierce and shear off a circular end of the container.

* * * * *